(12) United States Patent
Sasaki et al.

(10) Patent No.: US 11,485,844 B2
(45) Date of Patent: Nov. 1, 2022

(54) RESIN COMPOSITION AND INJECTION-MOLDED ARTICLE

(71) Applicants: TOYODA GOSEI CO., LTD., Kiyosu (JP); SHIRAISHI CALCIUM KAISHA, LTD., Osaka (JP)

(72) Inventors: Atsumasa Sasaki, Osaka (JP); Yutaka Minamino, Amagasaki (JP); Kenichiro Eguchi, Amagasaki (JP); Yasuaki Tanaka, Kiyosu (JP); Hitoshi Uchida, Kiyosu (JP)

(73) Assignees: TOYODA GOSEI CO., LTD., Aichi-pref. (JP); SHIRAISHI CALCIUM KAISHA, LTD., Osaka (JP)

( * ) Notice: Subject to any disclaimer, the term of this patent is extended or adjusted under 35 U.S.C. 154(b) by 342 days.

(21) Appl. No.: 16/773,321

(22) Filed: Jan. 27, 2020

(65) Prior Publication Data

US 2020/0247984 A1 Aug. 6, 2020

(30) Foreign Application Priority Data

Jan. 31, 2019 (JP) .............................. JP2019-015609

(51) Int. Cl.
| | | |
|---|---|---|
| *C08L 23/12* | (2006.01) | |
| *C08K 3/34* | (2006.01) | |
| *C08K 3/30* | (2006.01) | |
| *C08K 5/098* | (2006.01) | |
| *C08K 7/04* | (2006.01) | |
| *B29C 45/00* | (2006.01) | |
| *C08L 23/08* | (2006.01) | |
| *B29K 23/00* | (2006.01) | |

(52) U.S. Cl.
CPC .......... *C08L 23/12* (2013.01); *B29C 45/0001* (2013.01); *C08K 3/30* (2013.01); *C08K 3/34* (2013.01); *C08K 5/098* (2013.01); *C08K 7/04* (2013.01); *C08L 23/0815* (2013.01); *B29K 2023/08* (2013.01); *B29K 2023/12* (2013.01); *C08K 2003/3063* (2013.01); *C08K 2201/003* (2013.01); *C08K 2201/004* (2013.01); *C08K 2201/016* (2013.01); *C08L 2205/02* (2013.01); *C08L 2205/24* (2013.01)

(58) Field of Classification Search
CPC .. C08L 23/12; C08L 2205/24; C08L 23/0815; C08L 2205/02; C08K 3/34; C08K 7/04; C08K 3/30; C08K 5/098; C08K 2201/003; C08K 2003/3063; C08K 2201/016; C08K 2201/004; B29K 2023/12; B29K 2023/08; B29C 45/0001
USPC ........................................................ 524/493
See application file for complete search history.

(56) References Cited

U.S. PATENT DOCUMENTS

| | | | | |
|---|---|---|---|---|
| 5,039,525 | A | * | 8/1991 | Tamashima ............... C08K 3/34 524/423 |
| 6,319,991 | B1 | * | 11/2001 | Okayama ............... C08L 23/142 525/240 |
| 6,403,691 | B1 | * | 6/2002 | Zanka ....................... C08K 3/34 524/451 |
| 2012/0029123 | A1 | | 2/2012 | Yamamoto et al. |

FOREIGN PATENT DOCUMENTS

| | | | |
|---|---|---|---|
| CN | 102190829 A | | 9/2011 |
| JP | 2013-112718 A | | 6/2013 |
| JP | 2013112718 A | * | 6/2013 |
| JP | 2017-132929 A | | 8/2017 |

OTHER PUBLICATIONS

Office Action dated Jun. 6, 2022 in corresponding Chinese Patent Application No. 202010078954X (and English machine translation).

* cited by examiner

*Primary Examiner* — Hui H Chin
(74) *Attorney, Agent, or Firm* — Posz Law Group, PLC

(57) ABSTRACT

The present invention relates to a resin composition containing: 100 parts by weight of a polypropylene resin; 0.2 parts by weight to 2 parts by weight of an olefinic elastomer; 2 parts by weight to 5 parts by weight of a talc having an aspect ratio in a range of 35 to 60; 2 parts by weight to 5 parts by weight of a fibrous magnesium sulfate having an average fiber diameter of 0.1 μm to 2 μm and an average fiber length of 8 μm to 30 μm; and 0.01 parts by weight to 1 part by weight of a metallic soap that is at least one selected from the group consisting of a magnesium salt of a fatty acid and an aluminum salt of a fatty acid.

5 Claims, No Drawings

RESIN COMPOSITION AND INJECTION-MOLDED ARTICLE

TECHNICAL FIELD

The present invention relates to a resin composition containing a polypropylene resin and an injection-molded article using the resin composition.

BACKGROUND

In recent years, further reduction in weight is required in applications such as interior parts, exterior parts and the like for automobiles for the purpose of improving fuel consumption and the like. For reducing weight, investigations are being made to increase the use ratio of a thermoplastic resin.

Patent Literature 1 discloses a resin composition containing 40 to 50 mass % of a polypropylene resin, 20 to 30 mass % of an olefinic thermoplastic elastomer, 25 to 35 mass % of talc having a 50%0/particle diameter (D50) of 11 to 15 μm, and 1 mass % or more and less than 2 mass % of a fibrous filler having a length of 100 μm or less.

Patent Literature 2 discloses a polypropylene resin composition containing 100 parts by weigh of a propylene-ethylene block copolymer, 1 to 20 parts by weight of talc having an average particle diameter of 1 to 10 μm, 1 to 20 parts by weight of fibrous magnesium sulfate having an average fiber diameter of 0.1 to 1.5 μm and an average fiber length of 10 to 30 μm, and 1 to 100 parts by weight of an elastomer. Patent Literature 2 further describes that a weight ratio of the talc to the fibrous magnesium sulfate is in a range of 3:1 to 1.5:1 and the density of the resin composition is in a range of 0.950 to 1.000 g/cm.

Patent Literature 1: JP-A 2017-132929
Patent Literature 2: JP-A 2013-112718

SUMMARY

In Patent Literatures 1 and 2, attempts are being made to improve rigidity and impact resistance while reducing weight. However, rigidity such as flexural elasticity and impact resistance are conflicting properties with each other, and it is difficult to achieve the improvement of both rigidity and impact resistance. Furthermore, there may arise a problem that even if both rigidity and impact resistance have been enhanced, this causes an increase in weight. For this reason, even though the resin compositions of Patent Literatures 1 and 2 have been proposed, it was still difficult to enhance both rigidity and impact resistance while sufficiently reducing weight.

Accordingly, an object of the present invention is to provide a resin composition making it possible to enhance both rigidity and impact resistance while sufficiently reducing weight, and to provide an injection-molded article using the resin composition.

The resin composition of the present invention contains: a polypropylene resin; an olefinic elastomer; a talc having an aspect ratio in a range of 35 to 60; a fibrous magnesium sulfate having an average fiber diameter of 0.1 μm to 2 μm and an average fiber length of 8 μm to 30 μm; and a metallic soap that is at least one selected from the group consisting of a magnesium salt of a fatty acid and an aluminum salt of a fatty acid, in which the content of the olefinic elastomer is in a range of 0.2 parts by weight to 2 parts by weight per 100 parts by weight of the polypropylene resin, the content of the talc is in a range of 2 parts by weight to 5 parts by weight per 100 parts by weight of the polypropylene resin, the content of the fibrous magnesium sulfate is 2 parts by weight to 5 parts by weight per 100 parts by weight of the polypropylene resin, and the content of the metallic soap is in a range of 0.01 parts by weight to 1 part by weight per 100 parts by weight of the polypropylene resin.

In the present invention, the at least one selected from the group consisting of a magnesium salt of a fatty acid and an aluminum salt of a fatty acid is preferably a salt of a fatty acid containing a polar group.

In the present invention, the metallic soap is preferably the magnesium salt of a fatty acid.

In the present invention, the resin composition preferably further contains a crystal nucleating agent, and the content of the crystal nucleating agent is in a range of preferably 0.005 parts by weight to 1 part by weight per 100 parts by weight of the polypropylene resin.

In the present invention, the resin composition preferably has an MFR (230° C., 21.2N) measured according to JIS K7210: 2014 being in a range of 15 g/10 min to 60 g/10 min.

The injection-molded article of the present invention is formed of the resin composition according to the present invention.

According to the present invention, a resin composition making it possible to enhance both rigidity and impact resistance at high level while sufficiently reducing weight, and an injection-molded article using the resin composition can be provided.

EMBODIMENTS

The preferred embodiments of the present invention are described below. However, the following embodiments are merely exemplification, and the present invention is not construed as being limited to the following embodiments.

Resin Composition:

The resin composition of the present invention contains a polypropylene resin, an olefinic elastomer, talc, fibrous magnesium sulfate, and a metallic soap. The talc has an aspect ratio in a range of 35 to 60. The fibrous magnesium sulfate has an average fiber diameter of 0.1 to 2 μm and an average fiber length of 8 to 30 μm. The metallic soap is at least one of a magnesium slat of a fatty acid and an aluminum salt of a fatty acid.

The content of the olefinic elastomer is in a range of 0.2 to 2 parts by weight per 100 parts by weight of the polypropylene resin. The content of the talc is in a range of 2 to 5 parts by weight per 100 parts by weight of the polypropylene resin. The content of the fibrous magnesium sulfate is in a range of 2 to 5 parts by weight per 100 parts by weight of the polypropylene resin. The content of the metallic soap is in a range of 0.01 to 1 part by weight per 100 parts by weight of the polypropylene resin.

The present inventors have found that a resin composition containing a polypropylene resin, an olefinic elastomer, the above-described specific talc, the above-described specific fibrous magnesium sulfate, and the above-described specific metallic soap in the respective specific contents can enhance both rigidity and impact resistance while reducing weight.

Each component constituting the resin composition of the present invention is described in detail below.

(Polypropylene Resin)

The resin composition of the present invention contains a polypropylene resin.

The polypropylene resin is not particularly limited, and use can be made of, for example, a homopolymer of propylene and a copolymer of propylene and at least one other olefin monomer. The olefin monomer for the copolymer is not particularly limited, and use can be made of ethylene, butene and the like. The copolymer may be a random copolymer and may be a block copolymer.

The polypropylene resin is preferably a homopolymer of propylene from the standpoint of further enhancement of rigidity. On the other hand, the polypropylene resin is preferably a copolymer such as a block copolymer of propylene and ethylene from the standpoint of further enhancement of impact resistance.

The polypropylene resin has an MFR of preferably 5 g/10 min or more and more preferably 10 g/10 min or more, and is preferably 120 g/10 min or less and more preferably 100 g/10 min or less. In the case where the MFR of the polypropylene resin is the lower limit or more, moldability of the resin composition can be further increased. In the case where the MFR of the polypropylene resin is the upper limit or less, the resin composition can provide further enhanced rigidity. In the present description, MFR can be measured under the conditions of 230° C. and 21.2N according to JIS K7210: 2014.

The content of the polypropylene resin in 100 wt % of the resin composition is preferably 50 wt % or more and more preferably 70 wt % or more, and is preferably 97 wt % or less and more preferably 95 wt % or less. In the case where the content of the polypropylene resin is the lower limit or more, the resin composition can provide further enhanced rigidity. In the case where the content of the polypropylene resin is the upper limit or less, moldability of the resin composition can be further increased and the resin composition can provide further enhanced impact resistance.

(Olefinic Elastomer)

The resin composition of the present invention contains an olefinic elastomer.

The olefinic elastomer is not particularly limited, and use can be made of elastomers, for example, an ethylene-α-olefin copolymer such as an ethylene-propylene copolymer, an ethylene-butene copolymer, an ethylene-hexene copolymer, and an ethylene-octene copolymer; an ethylene-α-olefin-diene terpolymer such as an ethylene-propylene-butadiene copolymer and an ethylene-propylene-isoprene copolymer; and an ethylene-ethylene-butylene-ethylene copolymer. Those may be a random copolymer, but are desirably a block copolymer. Those may be used in one kind alone and may be used as mixtures of two or more kinds thereof.

The content of the olefinic elastomer is 0.2 parts by weight or more and preferably 0.5 parts by weight or more, and is 2 parts by weight or less and preferably 1.8 parts by weight or less, per 100 parts by weight of the polypropylene resin. In the case where the content of the olefinic elastomer is the lower limit or more, the resin composition can provide further enhanced impact resistance. In the case where the content of the olefinic elastomer is the upper limit or less, the resin composition can provide further enhanced rigidity.

(Talc)

The resin composition of the present invention contains talc.

The aspect ratio of the talc is 35 or more and preferably 40 or more, and is 60 or less and preferably 55 or less. In the case where the aspect ratio of the talc is in the above-mentioned range, the resin composition can provide further enhanced rigidity while enhancing impact resistance. The aspect ratio (length/width) can be obtained as an average value of 300 particles measured by a scanning electron microscope (SEM).

The average particle diameter of the talc is not particularly limited, but is preferably 1 μm or more and more preferably 3 μm or more, and is preferably 20 μm or less and more preferably 15 μm or less. In the case where the average particle diameter of the talc is in the above-mentioned range, the resin composition can provide further enhanced rigidity while maintaining impact resistance. The average particle diameter of the talc can be obtained as an average value of 300 particles measured by a scanning electron microscope (SEM).

The content of the talc is 2 parts by weight or more and preferably 3 parts by weight or more, and is 5 parts by weight or less and preferably 4 parts by weight or less, per 100 parts by weight of the polypropylene resin. In the case where the content of the talc is the lower limit or more, the resin composition can provide further enhanced rigidity. In the case where the content of the talc is the upper limit or less, the resin composition can provide further enhanced impact resistance, and further reduction in weight can be achieved.

(Fibrous Magnesium Sulfate)

The resin composition of the present invention contains fibrous magnesium sulfate.

The average fiber diameter of the fibrous magnesium sulfate is 0.1 μm or more and preferably 0.2 μm or more, and is 2 μm or less and preferably 1.5 μm or less. In the case where the average fiber diameter of the fibrous magnesium sulfate is in the above-mentioned range, the resin composition can provide further enhanced impact resistance while enhancing rigidity.

The average fiber length of the fibrous magnesium sulfate is 8 μm or more and preferably 10 μm or more, and is 30 μm or less and preferably 25 μm or less. In the case where the average fiber length of the fibrous magnesium sulfate is in the above-mentioned range, the resin composition can provide further enhanced impact resistance while enhancing rigidity.

The average fiber diameter and average fiber length of the fibrous magnesium sulfate can be obtained as average values of 300 particles measured by a scanning electron microscope (SEM).

The content of the fibrous magnesium sulfate is 2 parts by weight or more and preferably 2.5 parts by weight or more, and is 5 parts by weight or less and preferably 4.5 parts by weight or less, per 100 parts by weight of the polypropylene resin. In the case where the content of the fibrous magnesium sulfate is in the above-mentioned range, the resin composition can provide further enhanced impact resistance while enhancing rigidity.

(Metallic Soap)

The resin composition of the present invention contains a metallic soap.

The metallic soap is a magnesium salt of a fatty acid or an aluminum salt of a fatty acid. The metallic soap may be both the magnesium salt of a fatty acid and the aluminum salt of a fatty acid. The metallic soap is preferably the magnesium salt of a fatty acid from the standpoint of further enhancement of both rigidity and impact resistance.

The metallic soap is not particularly limited, and examples thereof include magnesium stearate, aluminum stearate, magnesium 12-hydroxystearate, aluminum 12-hydroxystearate, magnesium laurate, and aluminum laurate. Those may be used in one kind alone and may be used as mixtures of two or more kinds. Of those, a salt of a fatty acid having a polar group such as a hydroxyl group, for example, magnesium 12-hydroxystearate or aluminum 12-hydroxystearate, is preferred from the standpoint of further enhancement of both rigidity and impact resistance. A magnesium salt of a fatty acid having a polar group such as a hydroxyl group, for example, magnesium 12-hydroxystearate, is more preferred.

The content of the metallic soap is 0.01 parts by weight or more and preferably 0.02 parts by weight or more, and is 1 part by weight or less and preferably 0.8 parts by weight or less, per 100 parts by weight of the polypropylene resin. In the case where the content of the metallic soap is in the above-mentioned range, the resin composition can provide both further enhanced rigidity and impact resistance.

(Crystal Nucleating Agent)

The resin composition of the present invention may further contain a crystal nucleating agent. In the case where the crystal nucleating agent is further contained, the resin composition can provide further enhanced rigidity while enhancing impact resistance.

Examples of the crystal nucleating agent that can be used include metal salts of carboxylic acid such as sodium benzoate; metal salts of phosphoric acid ester such as sodium methylenebis(2,4-di-t-Bu-phenyl)phosphate; polyhydric alcohol derivatives such as dibenzylidene sorbitol; and amide compounds such as 1,3,5-tri(dimethylisopropylamino)-benzene. Those may be used in one kind alone and may be used as mixtures of two or more kinds.

The content of the crystal nucleating agent is preferably 0.001 parts by weight or more, more preferably 0.002 parts by weight or more and still more preferably 0.005 parts by weight or more, and is preferably 1 part by weight or less and more preferably 0.8 parts by weight or less, per 100 parts by weight of the polypropylene resin. In the case where the content of the crystal nucleating agent is in the above-mentioned range, the resin composition can provide further enhanced rigidity while enhancing impact resistance.

(Other Additives)

The resin composition of the present invention may contain additives other than the components described above in a range that does not impair the object of the present invention. Examples of the other additives include a filler such as calcium carbonate, kaolin clay and mica, an antioxidant, a heat stabilizer, an ultraviolet absorber, an optical stabilizer, a fibrous reinforcing agent, a lubricant, a flame retarder, an antistatic agent, and a colorant. The content of the other additives is not particularly limited, and is preferably 10 wt % or less per 100 wt % of the resin composition.

(Resin Composition)

The MFR of the resin composition of the present invention is preferably 15 g/10 min or more and more preferably 20 g/10 min or more, and is preferably 60 g/10 min or less and more preferably 50 g/10 min or less. In the case where the MFR of the resin composition is in the above-mentioned range, moldability of the resin composition can be further enhanced. The MFR of the resin composition can be measured under the conditions of 230° C. and 21.2N according to JIS K7210: 2014.

The resin composition of the present invention has a specific gravity of preferably 0.96 g/cm$^3$ or less and more preferably 0.95 g/cm$^3$ or less. In the case where the specific gravity of the resin composition is in the above-mentioned range, the weight of the resin composition can be further reduced.

The resin composition of the present invention has a flexural modulus of preferably 2,000 MPa or more.

The resin composition of the present invention has a Charpy impact strength of preferably 9.0 kJ/m$^2$ or more.

(Method for Producing Resin Composition)

The resin composition of the present invention can be obtained by mixing and kneading the components described above by a conventional method. Examples of the mixing and kneading method include methods using a ribbon blender, Heschel mixer, Banbury mixer, a drum tumbler, a single-screw extruder, a twin-screw extruder, a co-kneader, and a multi-screw extruder. Heating temperature during kneading is determined on the basis of a melting point of each component.

Injection-Molded Article:

The injection-molded article of the present invention can be obtained by molding the resin composition described above by a conventional injection-molding method. Because the injection-molded article of the present invention is obtained by injection-molding the resin composition described above, both rigidity and impact resistance of the injection-molded article can be enhanced while reducing its weight.

The injection-molded article is not particularly limited, and can be interior parts and exterior parts (including an outside plate) of automobiles, interior parts and exterior parts (including an outside plate) of railway vehicles and buildings, and cases and parts of electric appliances. Examples of the interior parts and exterior parts of automobiles include bonnet hoods, fenders, bumpers, doors, trunk grids, roofs, radiator grills, wheel caps, instrument panels, pillar garnishes, consoles, glove boxes, and door trims.

EXAMPLES

Specific examples according to the present invention will be described below, but it should be understood that the present invention is not construed as being limited to those examples.

Compounding components used in Examples and Comparative Examples below are described.

Polypropylene resin: polypropylene, manufactured by Japan Polypropylene Corporation, item number "NEWCON NBX03GH", MFR: 23 g/10 min Olefinic elastomer: ethylene-octene copolymer, manufactured by Dew Chemical, item number "ENGAGE8842"

Talc: talc A (manufactured by Nippon Talc Co., Ltd., item number "PAOG-2", aspect ratio: 50, average particle diameter: 5 µm), talc B: (manufactured by Nippon Talc Co., Ltd., item number "RA-3", aspect ratio: 35, average particle diameter: 5 µm), talc C: (manufactured by Nippon Talc Co., Ltd., item number "L-1", aspect ratio: 20, average particle diameter: 5 µm), talc D: (manufactured by Nippon Talc Co., Ltd., item number "M-3", aspect ratio: 20, average particle diameter: 10 µm), Fibrous magnesium sulfate: manufactured by Ube Materials Industries, Ltd., item number "MOS.HIGE", average fiber length: 8 to 30 µm, average fiber diameter: 0.5 to 1 µm Metallic soap: magnesium 12-hydroxystearate (manufactured by Nitto Kasei Kogyo K.K., item number: "MS-6"), aluminum 12-hydroxystearate (manufactured by Nitto Kasei Kogyo K.K, item number: "AS-6"), magnesium stearate (manufactured by Nitto Kasei Kogyo K.K., item number: "MS-7"), sodium stearate (manufactured by Nitto Kasei Kogyo K.K., item number: "CS-3")

Crystal nucleating agent: sodium methylenebis(2,4-di-t-Bu-phenyl)phosphate, manufactured by ADEKA, item number: "ADEKA STAB NA-11")

Example 1

To 100 parts by weight of the polypropylene resin were mixed 1.1 parts by weight of the polyolefin elastomer, 3.8 parts by weight of talc A, 3.8 parts by weight of the fibrous magnesium sulfate, and 0.043 parts by weight of magnesium 12-hydroxystearate, followed by melt-kneading at 220° C. in a screw revolution speed of 300 rpm by using a twin-screw extrusion kneader, to thereby prepare a resin composition.

The resin composition obtained was molded by using an injection-molding machine to obtain an injection-molded article. Conditions of the injection-molding were temperature: 200° C. and mold temperature: 40° C. Before the molding, the resin composition was dried at 110° C. for 4 hours by using a heating drier.

Examples 2-6 and Comparative Examples 1-6

Resin compositions and corresponding injection-molded articles were obtained in the same manners as in Example 1, except for changing the amount of the polypropylene resin, the amount of the polyolefin elastomer, the kind or mixing amount of the talc, the amount of the fibrous magnesium sulfate, the kind of the metallic soap, and/or the amount of the crystal nucleating agent as shown in Table 1 below.

(Evaluation)

The resin compositions or injection-molded articles obtained in the Examples and Comparative Examples were evaluated as follows. The evaluation results are shown in Table 1 below.

Fluidity (MFR)

Fluidity of the resin compositions obtained in the Examples and Comparative Examples was measured under the conditions of 230° C. and 21.2N according to JIS K7210: 2014.

Flexural Modulus

Flexural modulus of the injection-molded articles obtained in the Examples and Comparative Examples was measured at 23° C. according to JIS K7171: 2016.

Charpy Impact Strength

Charpy impact strength of the injection-molded articles obtained in the Examples and Comparative Examples was measured at 23° C. according to JIS K7111: 2012. Test pieces were notched test pieces.

Specific Gravity

Specific gravity of the resin compositions obtained in the Examples and Comparative Examples was measured according to JIS K7112: 1999.

The present invention is not limited to the description of respective embodiments and each of the aspects. The present invention also includes various modifications which can be easily conceived by those skilled in the art without departing from the description of the claims. The contents of publications mentioned in the present specification are incorporated by reference in its entity.

The present application is based on the Japanese Patent Application No. 2019-015609 filed on Jan. 31, 2019, and the entire contents thereof are incorporated herein by reference.

What is claimed is:

1. A resin composition comprising:
   a polypropylene resin;
   an olefinic elastomer;
   a talc having an aspect ratio in a range of 35 to 60;
   a fibrous magnesium sulfate having an average fiber diameter of 0.1 μm to 2 μm and an average fiber length of 8 μm to 30 μm;
   a metallic soap that is at least one selected from the group consisting of a magnesium salt of a fatty acid and an aluminum salt of a fatty acid; and
   a crystal nucleating agent, wherein
   the content of the olefinic elastomer is in a range of 0.2 parts by weight to 2 parts by weight per 100 parts by weight of the polypropylene resin,
   the content of the talc is in a range of 2 parts by weight to 5 parts by weight per 100 parts by weight of the polypropylene resin,
   the content of the fibrous magnesium sulfate is 2 parts by weight to 5 parts by weight per 100 parts by weight of the polypropylene resin,
   the content of the metallic soap is in a range of 0.01 parts by weight to 1 part by weight per 100 parts by weight of the polypropylene resin, and
   the content of the crystal nucleating agent is in a range of 0.005 parts by weight to 1 part by weight per 100 parts by weight of the polypropylene resin.

2. The resin composition according to claim 1, wherein the at least one selected from the group consisting of a magnesium salt of a fatty acid and an aluminum salt of a fatty acid is a salt of a fatty acid containing a polar group.

3. The resin composition according to claim 1, wherein the metallic soap is the magnesium salt of a fatty acid.

TABLE 1

|  |  | Ex. 1 | Ex. 2 | Ex. 3 | Ex. 4 | Ex. 5 | Ex. 6 | Comp. Ex. 1 | Comp. Ex. 2 | Comp. Ex. 3 | Comp. Ex. 4 | Comp. Ex. 5 | Comp. Ex. 6 |
| --- | --- | --- | --- | --- | --- | --- | --- | --- | --- | --- | --- | --- | --- |
| Polypropylene resin | | 100 | 100 | 100 | 100 | 100 | 100 | 100 | 100 | 100 | 100 | 100 | 100 |
| Olefinic elastomer | | 1.1 | 1.1 | 1.1 | 1.1 | 1.1 | 1.1 | 1.1 | 1.1 | 1.1 | 1.4 | | 1.1 |
| Talc | Talc A | 3.8 | 3.8 | 3.8 | 3.8 | 3.8 | | 3.8 | | | 33.8 | 3.8 | 3.8 |
|  | Talc B | | | | | | 3.8 | | | | | | |
|  | Talc C | | | | | | | | 3.8 | | | | |
|  | Talc C | | | | | | | | | 3.8 | | | |
| Fibrous magnesium sulfate | | 3.8 | 3.8 | 3.8 | 3.8 | 3.8 | 3.8 | 3.8 | 3.8 | 3.8 | | 3.8 | 3.8 |
| Metallic soap | Magnesium 12-hydroxystearate | 0.043 | | | 0.8 | 0.043 | 0.043 | | 0.043 | 0.043 | 0.054 | 0.043 | 1.2 |
|  | Aluminum 12-hydroxystearate | | 0.043 | | | | | | | | | | |
|  | Magnesium stearate | | | 0.043 | | | | | | | | | |
|  | Sodium stearate | | | | | | | | | 0.043 | | | |
| Crystal nucleating agent | | | | | | 0.003 | | | | | | | |
| Fluidity (MFR) | | 45 | 42 | 42 | 49 | 40 | 49 | 40 | 42 | 45 | 25 | 38 | 49 |
| Flexural modulus (MPa) | | 2030 | 2030 | 2000 | 2000 | 2100 | 2000 | 1920 | 1930 | 1920 | 2000 | 2200 | 1940 |
| Charpy impact strength (kJ/m$^2$) | | 9.7 | 9.0 | 9.8 | 9.6 | 9.5 | 9.6 | 9.5 | 9.9 | 9.4 | 9.5 | 4.0 | 9.6 |
| Specific gravity (g/cm$^3$) | | 0.94 | 0.95 | 0.94 | 0.94 | 0.94 | 0.94 | 0.94 | 0.94 | 0.94 | 1.05 | 0.94 | 0.94 |

4. The resin composition according to claim 1, having an MFR measured under the conditions of 230° C. and 21.2N according to JIS K7210: 2014 being in a range of 15 g/10 min to 60 g/10 min.

5. An injection-molded article, formed of the resin composition described in claim 1.

\* \* \* \* \*